Feb. 17, 1970          D. W. BIKLEN          3,496,051
APPARATUS FOR DISASSEMBLY OF CURED LAMINATE BOOKS
Filed Dec. 2, 1966
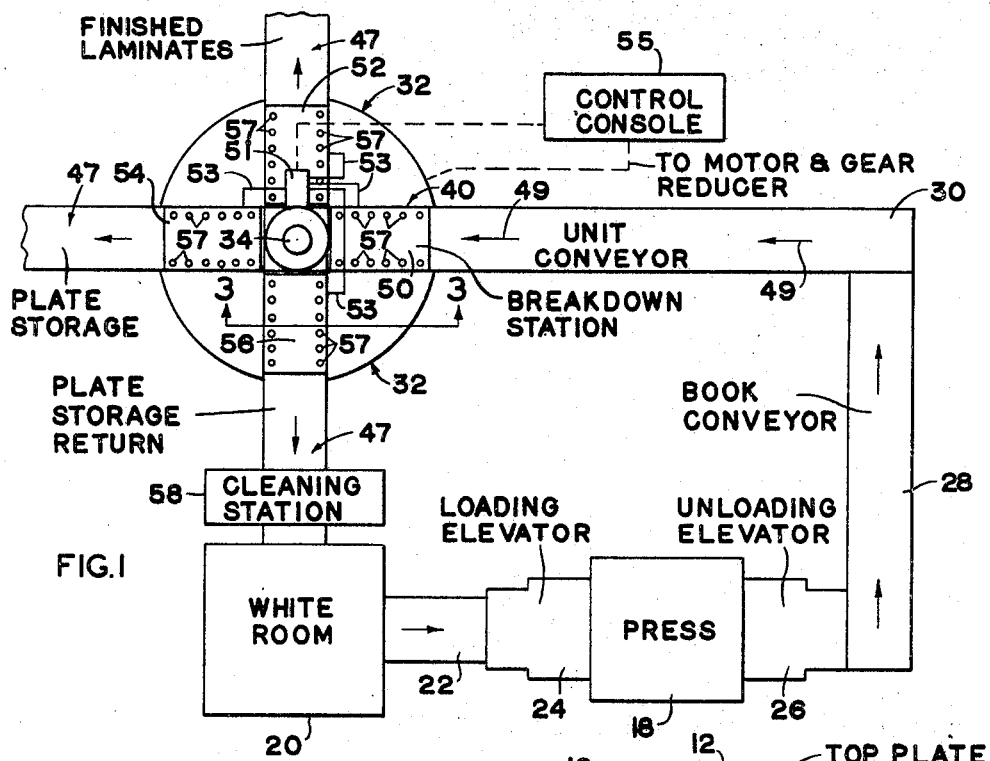
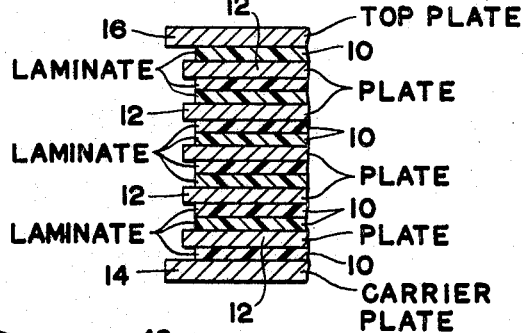
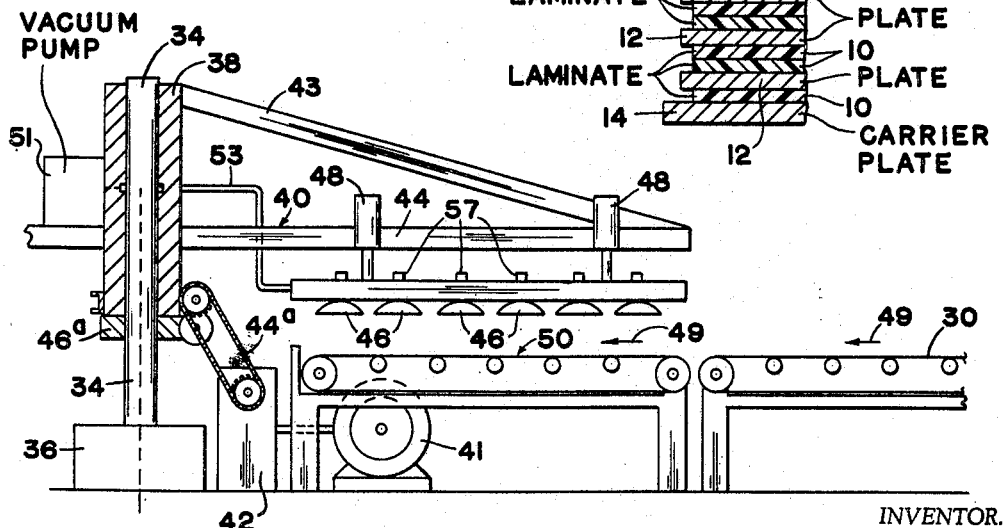
INVENTOR.
DONALD W. BIKLEN
BY
Oldham & Oldham
ATTYS.

United States Patent Office 3,496,051
Patented Feb. 17, 1970

3,496,051
APPARATUS FOR DISASSEMBLY OF CURED LAMINATE BOOKS
Donald W. Biklen, Hudson, Ohio, assignor to Adamson United Company, Akron, Ohio, a corporation of Ohio
Filed Dec. 2, 1966, Ser. No. 598,728
Int. Cl. B32b *35/00;* B23p *19/02*
U.S. Cl. 156—584                                4 Claims

ABSTRACT OF THE DISCLOSURE

Apparatus for disassembling the components of cured laminate books, including a vertical support post, a breakdown station positioned adjacent the support post to receive and position laminate books thereon, and rotary handler means journalled to the support post, said rotary handler means having arms secured thereto and extending radially therefrom.

Engaging means are positioned on the arms to releasably engage with, lift and carry components of the laminate books from the breakdown station to discharge stations, and drive and control means are present for the rotary handler means and engaging means.

---

This invention relates to an improved method used in handling cured laminates and those components used in the manufacture of laminates. More particularly this invention relates to particular apparatus which is used to assemble and disassemble "books" used in laminate manufacture. The term "book" as used in laminate manufacture refers to a plurality of laminates and steel plates (usually polished) which are handled on a carrier plate. Each "book" generally has multiple laminates that are produced in a press under heat and pressure. Also, the press can contain multiple books.

It is the general object of the invention to provide apparatus which efficiently and rapidly disassemble the laminate books after the laminate sheets contained within the "books" have been cured in a press. The apparatus can also be considered as assembling the laminates prior to curing; however, the invention will be focused on the disassembly of the finished laminate. Generally, the components that go into the laminate books such as carrier plates, steel plates, and sometimes cover plates are large and heavy and require careful handling. It is highly desirable to provide apparatus which can quickly disassemble the laminate books, carefully remove the finished laminate sheets to a conveyor and return the other components to an area for immediate reuse or storage.

In the drawings, FIG. 1 is a diagrammatic plan view of an overall laminate manufacturing process, particularly illustrating the rotary handler adapted to disassemble the components of the laminate books.

FIG. 2 is a greatly enlarged, fragmentary, cross sectional view particularly illustrating the components of a book in laminate manufacture; and FIG. 3 is a diagrammatic, partially broken away, side elevation as seen from line 3—3 of FIG. 1, particularly illustrating an arm of the rotary handler and the conveyor station associated therewith, with portions of the apparatus illustrated in cross section.

Referring first to FIG. 2, this figure particularly illustrates, with the thickness greatly exaggerated, a book used in the manufacture of a laminate. The book is made up of several layers of laminate 10 which are sandwiched with a plurality of steel plates (usually polished) 12, between a carrier plate 14 and a top plate 16. The book of laminates is generally only about one-half to two inches thick but usually the pieces of the laminate 10 are extremely large, for example, five feet by twelve feet, and very difficult to handle. The steel carrier plates 14 and the top plates 16 generally weigh over five hundred pounds each. These plates with the (polished) plates 12 also being heavy, make for cumbersome handling. It is therefore necessary that the books of laminates 10 be handled carefully. In a high volume laminate manufacturing process, about twenty of the laminate books can be cured in a press 18 with the (textured or polished) surfaces of the plates 12 imparting a desired surface finish to the laminates.

Referring to FIG. 1, the complete laminate manufacturing process is illustrated. In a white room 20, the books of laminate are assembled with the pieces of uncured, unfinished laminate 10 being placed with the polished steel plates 12 between the top plates 16 and the carrier plates 14. The laminate books are then passed from the white room by a conveyor 22 into a loading elevator 24 where a quantity of laminate books is loaded into the press 18 for pressing and curing usually by heat. The number of books depends on the size of the press. After the curing process is completed, the stock of laminated books is unloaded from the press by means of an unloading elevator 26 and transferred one at a time to a conveyor 28. The conveyor 28 conveys the cured books to unit conveyors 30 where each book, one at a time, is positioned at the breakdown or disassembly stations.

To facilitate the disassembly of the individual laminate books, a rotary handler indicated generally by the numeral 32 is provided. The rotary handler 32, best illustrated by FIGS. 1 and 3, is rotatably journalled on a suitable fixed center post 34 mounted to a base means 36. The rotary handler 32 consists of a hub 38 rotatably mounted on the center post 34. A plurality of arms 40 are mounted to extend radially from the hub 38. While the drawings illustrate four arms it should be understood that any number of arms may be utilized. The hub 38 is rotatably driven by a variable speed motor 41 acting through gear reducer 42, chain and sprocket means 44a and a suitable worm gear 46a. Support arms 43 secured to the hub 38 help support the cantilevered ends of the arms 40.

The purpose of such arms 40 is to facilitate in the disassembly of a laminate book and each arm is adapted to pick up and remove a component of the book from the balance of the book when the arms 40 of the rotary handler 32 are rotated about the axis of the hub in windmill fashion and in a horizontal plane. Specifically, this is accomplished by vacuum frame means 44 which are secured to each arm 40. The vacuum frame means 44 are provided with a plurality of suction devices 46 which are adapted to set down on and releasably engage with a component of the book used in the laminate manufacture as will be explained in further detail hereinafter. Hydraulic or mechanically actuated means 48 connected between the arms 40 and the vacuum frame means 44 press the suction devices 46 into releasable engagement with the top component of the laminate book by providing a controlled pressured lowering of the vacuum frame means 44.

Associated with each of the rotating arms 40 and cooperating therewith in the disassembly of the components or layers of the laminate books are a plurality of discharge or conveyor stations, indicated generally by numeral 47, as seen in FIG. 1. In FIG. 3, as previously explained, each laminate book will be conveyed by the unit conveyors 30 in the direction of the arrows 49. The unit conveyors 30 will consecutively move the individual laminate books onto a breakdown station conveyor 50, positioned accurately under one of the extending arms 40 on the rotary handler. Positioned in the same plane as and being substantially identical to the breakdown station conveyor 50 are a finished laminate conveyor 52, a plate storage conveyor 54, and a plate return conveyor 56, these being best illustrated in FIG. 1.

In the actual operation of the rotary handler 32, a laminate book is transported from the unit conveyor 30 onto the breakdown station conveyor 50 where it is accurately positioned. Variable speed motor 41 drives the hub 38 until one of the arms 40 is rotated to a position substantially above the laminate book positioned on the breakdown station conveyor 50. At this point the hub is stopped either manually by the rotary handler operator or is programmed to stop as will be explained hereinafter. The means 48 on the respective arms 40 are then properly actuated, either mechanically or hydraulically, to lower the frame means 44 until the suction devices 46 on the vacuum frame means 44 are forced into releasable engagement with the top plate 16 on the laminate book.

Associated with the vacuum frame means 44 is a vacuum pump 51 which acts through hoses 53 to provide a strong suction at each one of the suction devices 46 positioned on the vacuum frame means 44. The vacuum frame means 44 is then raised by the hydraulic or mechanical means 48 and the suction force imparted by the vacuum pump 51 acting through the suction devices 46 is strong enough to lift the top plate 16 until it has been removed from the laminate book. Motor 41 then drives the rotary handler until the next arm is rotated anl indexed to a position above the breakdown station conveyor 50. The vacuum frame 44 again is lowered and suction devices 46 associated with this vacuum frame 44 are then forced into releasable engagement with the next component of the laminate book, which would be a sheet of the finished laminate 10. The windmill action of the arms of the rotary handler continues sequentially and the components of the laminate book which have been removed from the balance of the book on the breakdown station conveyor 50 are carried by an arm 40 of the rotary handler until the component is positioned above either plate return conveyor 56, the plate storage conveyor 54, or the finished laminate conveyor 52. Thus, as one of the arms 40 picks up a component of the laminate book at the breakdown station conveyor 50, one of the other arms 40 of the rotary handler which has previously picked up a component simultaneously releases it at one of the other three conveyor stations 56, 54, or 52, depending upon which component the arm 40 is carrying. The rotation of the arms of the rotary handler continues until the entire laminate book has been disassembled. Rotation may be clockwise or counterclockwise. In FIG. 1 rotation would be clockwise for efficient operation.

This simultaneous releasing of a component carried by one of the arms 40 at the proper conveying station can be accomplished by any of a number of suitable ways. In a preferred embodiment of the invention, the entire book disassembly process is programmed and an automatic control console 55, as seen in FIG. 1, selectively and automatically closes valves 57 positioned in the vacuum frame means 44 so as the component carried by the vacuum frame means 44 will automatically be released onto the proper conveyor station. Such selective control of valves 57 also provides for peeling pickup to prevent a vacuum between the respective sheets of the book. All operations of the rotary handler are controlled either automatically or manually from the control console 55 in this embodiment of the invention.

Thus, it can be readily understood that the laminate book is rapidly and efficiently disassembled with the finished laminates being dropped on conveyor 52, with the top plates 16 and the carrier plate 14 being dropped on the plate return conveyor 56, and the plates 12 being dropped at either the plate storage conveyor 54 or the plate return conveyor 56 as will be explained hereinafter.

A cleaning station 58 is provided which is adapted to automatically clean the plates 12, the top plate 16, and the carrier plate 14 before they are returned into the white room 20. It will be readily appreciated that the speed of the rotary handler 32 can be accelerated, or decelerated according to suit the time cycle at which the laminate books are being fed into the breakdown station conveyor 50. In an efficient laminate manufacture operation, the total number of books contained in a press load (twenty, for example), should be completely disassembled with the components of the book being dropped on the proper conveyor station within the time that the next press load is curing in the press.

In the decorative laminate manufacture, it is quite common to make laminates of various sizes and shapes. Since the steel plates 12 are the sizes of the laminates, this means that the plates 12 must be taken out of the manufacturing line when a size change in the laminate produced is necessary. This can be accomplished without added effort and without interrupting the time cycle since the arms 40 of the rotary handler can simply deposit the plates 12 which are to be taken out of the line onto the plate storage conveyor 54, where they will be conveyed to a suitable plate storage area.

The entire cycle of the laminate manufacturing process is easily adapted to be programmed, as by the automatic control console 55, as seen in FIG. 1, so that the efficiency of the book disassembly process is greatly increased.

What is claimed is:

1. Apparatus for disassembling the components of cured laminate books, including:
    a fixedly positioned support post,
    a breakdown station positioned adjacent said support post to position laminate books thereon and positioning them in a horizontal plane,
    rotary handler means journalled to said support post, said rotary handler means having at least one arm secured thereto and extending radially therefrom above said horizontal plane,
    engaging means positioned on said arm and adapted to releasably engage with and remove a component of a laminate book at said breakdown station,
    a plurality of circumferentially spaced discharge stations positioned at uniform radial distances from said support post and being in said horizontal plane to receive at least one component of a said book thereon,
    conveyor means individually connecting to said discharge stations to remove components therefrom,
    said breakdown station also being at said uniform radial distance from said support post, and
    drive means adapted to drive said rotary handler means through an arc, said engaging means positioned on said arm being adapted to consecutively pick up a separate component of the laminate book and transport it to and release it on a discharge station positioned substantially under the arm of said rotary handler means at a point arcuately remote from said breakdown station.

2. Apparatus for disassembling the components of cured laminate books as in claim 1 and where said rotary handler means is comprised of a hub, and a plurality of circumferentially spaced radially extending arms are secured to said hub and are adapted to overlie simultaneously said discharge stations.

3. Apparatus for disassembling the components of cured laminate books as in claim 2 and comprising one of said engaging means being positioned on each of said arms and each including:
    a frame operatively mounted on each of said arms,
    vacuum-type article engaging means operatively carried by each of said frames,
    a controllable vacuum system connected to said vacuum-type article engaging means whereby actuating the vacuum system creates a lifting force in said article engaging means sufficient for it to lift and hold a component of the books, and power actuated means connect said frame to said arm to raise and lower said frame to aid in separating a component of said laminate book therefrom.

4. Apparatus according to claim 2 where control means are provided for said drive means, vacuum system, and power actuated means so that as the article engaging means secured to one of said arms is picking up a component of the laminate book at least one of the article engaging means on one of the other of said arms is simultaneously releasing another component of a laminate book onto one of said discharge stations.

References Cited

UNITED STATES PATENTS

| | | | |
|---|---|---|---|
| 406,059 | 7/1889 | Orser | 251—5 |
| 911,070 | 2/1909 | Ranz | 156—568 |
| 3,218,069 | 11/1965 | Halberschmidt | 214—1 X |

BENJAMIN A. BORCHELT, Primary Examiner

S. C. BENTLEY, Assistant Examiner

U.S. Cl. X.R.

29—200, 208